United States Patent [19]
Sprague

[11] Patent Number: 5,968,320
[45] Date of Patent: Oct. 19, 1999

[54] NON-RECOVERY COKE OVEN GAS COMBUSTION SYSTEM

[75] Inventor: Hugh H. Sprague, Puslinch, Canada

[73] Assignee: Stelco, Inc., Hamilton, Canada

[21] Appl. No.: 08/797,787

[22] Filed: Feb. 7, 1997

[51] Int. Cl.$^6$ .............................. C10B 1/00; C10B 39/00; C10J 1/04

[52] U.S. Cl. ................................ 202/113; 201/1; 201/26; 201/35; 201/39; 202/151; 202/160; 202/205; 202/227; 122/5; 431/185; 431/190; 431/19; 236/15

[58] Field of Search ..................................... 202/134, 135, 202/137, 139, 151, 269, 87.95, 106, 113, 160, 205, 227; 431/183, 185, 190, 351, 19; 126/351; 201/1, 26, 35, 39; 122/5, 451.1; 165/281, 287; 236/14, 15

[56] References Cited

U.S. PATENT DOCUMENTS

| | | |
|---|---|---|
| 1,523,414 | 1/1925 | Gibson . |
| 2,380,930 | 8/1945 | Andersen et al. . |
| 2,658,349 | 11/1953 | Keller . |
| 2,920,689 | 1/1960 | Tinker . |
| 3,049,300 | 8/1962 | Lewis et al. . |
| 3,119,440 | 1/1964 | Cruise et al. . |
| 3,260,243 | 7/1966 | Wiesenthal et al. . |

(List continued on next page.)

FOREIGN PATENT DOCUMENTS

| | | |
|---|---|---|
| 0225655 | 6/1987 | European Pat. Off. . |
| 327516 | 8/1989 | European Pat. Off. . |
| 2256701 | 12/1992 | United Kingdom . |

OTHER PUBLICATIONS

R. Wintrell, "The Corex® Process", 1992 Ironmaking Conference Proceedings, 469–477.

J.H. Currey et al, "By Product Revisions at Citizens Gas and Coke Utility", 1990 Ironmaking Proceedings, 531–533.

J.H. Currey, "Vascasulf Operation at Citizens Gas and Coke Utility", Mar. 6, 1995.

J.H. Currey, Ammonia Destruction at Citizen's Gas and Coke Utility, 1–9.

J.H. Currey, "New Process for Coke Oven Gas Desulfurization at Citizens Gas and Coke Utility", Eastern States Blast Furnach and Coke Oven Association, Pittsburgh, PA, Feb. 10, 1995.

W.T. Hogan et al., Steel's Coke Deficit: 5.6 Million Tons and Growing, New Steel, Dec. 1996.

*Primary Examiner*—Virginia Manoharan
*Attorney, Agent, or Firm*—Alston & Bird LLP

[57] ABSTRACT

A system for transporting and burning under negative pressure in a boiler a raw coke oven gas to produce steam energy. The system has the usual battery of coke ovens and corresponding ascension pipes connected to a collector main. Flushing liquor is sprayed into the hot coke oven gases to effect cooling in the collector main. A transport main delivers the cooled raw coke oven gases and flushing liquor to a burner of a steam producing boiler where the transport main includes a downcomer for separating the raw coke oven gas from the flushing liquor. The coke oven gas is burned in the boiler where a suction fan is provided at the exhaust of the boiler to develop a negative pressure in the system where the boiler has reinforced walls to withstand the negative pressure. A change in negative pressure in the system is detected and monitored by a controller system which varies draw of the suction fan in response to a detected change in negative pressure in the system. The system is readily retrofitted to existing coke ovens and in turn replaces the usual by-products plant. The generated steam may be used in the co-generation of electrical or mechanical energy. The system may be controlled in a manner to minimize and/or eliminate surplus flushing liquors.

17 Claims, 7 Drawing Sheets

U.S. PATENT DOCUMENTS

| | | |
|---|---|---|
| 3,279,520 | 10/1966 | Wiesenthal . |
| 3,292,345 | 12/1966 | Wunderlich et al. . |
| 3,362,902 | 1/1968 | Kivlen et al. . |
| 3,433,218 | 3/1969 | Wiesenthal . |
| 3,581,715 | 6/1971 | Singer . |
| 4,100,033 | 7/1978 | Holter . |
| 4,287,024 | 9/1981 | Thompson . |
| 4,574,744 | 3/1986 | Lorenz et al. ............... 110/234 |
| 4,820,500 | 4/1989 | Obermüller . |
| 4,829,957 | 5/1989 | Garretson et al. ............ 123/527 |
| 5,101,772 | 4/1992 | Bruhn . |
| 5,224,334 | 7/1993 | Bell . |
| 5,236,470 | 8/1993 | Levin . |
| 5,237,963 | 8/1993 | Garcia-Mallol . |
| 5,295,448 | 3/1994 | Vickery . |
| 5,325,821 | 7/1994 | Glöersen ........................ 165/2 |
| 5,332,052 | 7/1994 | McCrillis et al. . |
| 5,433,600 | 7/1995 | Jeng et al. . |
| 5,520,123 | 5/1996 | Chappell et al. . |
| 5,553,554 | 9/1996 | Urich, Jr. . |
| 5,572,956 | 11/1996 | Hallstrom et al. . |

NON-RECOVERY COKE OVEN GAS COMBUSTION SYSTEM

SCOPE OF THE INVENTION

This invention provides for the conversion of raw coke oven gas into electrical power by burning the raw coke oven gas under negative pressure in a boiler/steam generation unit. The system accommodates the aggressive raw coke oven gas which includes tar, pitch, napthalene and coke/ash particulate which would normally foul and corrode the system during continuous operation. The system is capable of burning the raw coke oven gas without upstream pumping or compressing equipment and without mass flow metering systems in contact with the raw oven gas which would normally render such units inoperable. The system operates under negative pressure, where the negative pressure is developed in the system by the provision of a suction fan at the exhaust of the boiler. The negative pressure in the system is monitored and the draw of the suction fan varied as required to ensure that at the coke ovens, a slight negative pressure is maintained and to ensure delivery of the raw coke oven gases to the burner of the steam producing boiler. The system is capable of operating without generation of surplus flushing liquors.

BACKGROUND OF THE INVENTION

The blast furnace process is the prevailing method of primary iron production. Considering the large investment in blast furnaces, it is doubtful that the technology will be replaced in the next 20 years, the life expectancy of the present blast furnaces.

Coke is an essential blast furnace feed stock. Coke serves as a fuel, to supply heat and to produce a reducing atmosphere, and contributes to the permeability of the furnace burden. Coke is produced by the destructive distillation of coal. In the distillation process, coal is heated in an oven in the absence of air (oxygen). The volatile matter (methane, hydrogen, tar, benzene, ammonia, naphthalene, etc.) is driven off leaving behind a solid material comprising mostly carbon, which is called coke.

The volatiles produced from early coke making facilities were burned as they evolved from the coke ovens. The recovery of the volatiles for use as chemical feed stocks and fuel was a significant early advancement in coke making technology. The recovered coal chemicals, which include: coal tar, light oil (benzene, toluene, xylene), naphthalene, and ammonia, were the foundation of the chemical industry for the first half of this century. Coke oven gas, consisting of methane, hydrogen and the other gaseous hydrocarbons that remained after the coal chemicals were removed, was distributed through pipelines to neighboring industries and towns to be used as an industrial and domestic fuel. Many coke plants were operated primarily for the recovered chemicals and coke oven gas, the coke being a secondary product that contributed little to the profitability of the plant.

In recent years, the chemical industry has shifted away from coal chemicals and is now based primarily on chemicals produced from petroleum and natural gas. Natural gas has become the industrial and domestic fuel of choice, eliminating the need for coke oven gas. Coke ovens now exist to supply coke for the blast furnace and to a much lesser extent the foundry industry. The recovered coal chemicals are commonly sold at a loss considering the high cost of operating and maintaining the chemical recovery plant (referred to as the by-product plant by the iron and steel industry where the primary product is coke).

The energy required to operate a by-products plant is about one half the value of the recovered chemicals and coke oven gas. Continued large capital investment is also required to up-grade by-product plants so that they comply with increasingly stringent environmental requirements.

Considering that there is little to be gained by recovering coal chemicals, developments in coke making technology have reverted back to non-recovery principles such as described in U.S. Pat. No. 4,287,024. Once again, coke ovens are being designed to burn the volatiles as they evolve from the ovens. However, to achieve an energy efficiency approaching that of a recovery coke making facility, the products of combustion of the volatiles are conducted under the ovens so that the heat required for the coking process can be extracted. The combustion products are then ducted to waste heat recovery boilers where much of the remaining heat is extracted to produce steam. The steam is used for power generation and heating. The modern non-recovery coke oven technologies are based on special oven design. It is not possible to convert or retrofit existing recovery coke ovens to these non-recovery technologies.

Other attempts in dealing with coke oven gases for purposes of combustion and/or elimination of toxic components are described in U.S. Pat. Nos. 3,292,345; 3,581,715; 4,100,033 and 5,433,600. U.S. Pat. No. 3,292,345 describes the combustion of ammonia and $H_2S$ gases removed from the coke oven gases by way of a stripping operation. This approach does not replace the by-products facility but instead only replaces one unit of that facility in dealing with the ammonia gases. U.S. Pat. No. 3,581,715 describes the production of calcium carbides in the use of a continuous travelling grate stoker. The temperatures and products of combustion in making the calcium carbide are cooled before providing supplementary fuel for a steam generator. U.S. Pat. No. 4,100,033 describes the immediate combustion of volatiles as they are emitted during the coke oven charging step. This set-up is not designed for continuous operation in treating coke oven gas during the entire coking process. U.S. Pat. No. 5,433,600 describes a burner for burning coke oven gases. The burner construction is designed for burning coke oven gases derived from a by-products facility. The small diameter fuel orifices and swirling elements in the fuel stream would tend to clog due to all of the tar and fines constituent in the raw coke oven gases and not provide satisfactory service.

The life expectancy of existing recovery coke ovens is between 5 and 20 years. Because of the large capital cost of coke plants, these plants will continue to operate to the end of their lives to supply blast furnace coke. By design, the recovery coke oven requires the operation of the associated by-product plant. The by-product plant provides the following necessary operating requirements:

1) Suction required to remove the volatiles from the ovens.
2) Pressure control for the coke ovens. The pressure on the ovens must be precisely controlled so that it is slightly negative to prevent leakage of volatiles and to limit the amount of air infiltration.
3) The production of coke oven gas to underfire the ovens.
4) Eliminate the coal chemicals in an environmentally acceptable manner.
5) Achieve an acceptable plant energy efficiency for economical and environmental reasons.

The non-recovery coke making system of this invention supports the operation of existing or new recovery type coke oven batteries by providing the above listed essential operating requirements as a by-product plant. However, they are provided in a completely different manner.

The volatiles from recovery coke ovens, which equate to the raw coke oven gases, have never been considered to be a practical fuel. No technology exists to handle the volatiles at a temperature high enough to prevent the heavy components of the tar and pitch from condensing. Present technology for cooling and transporting the volatiles to the by-products plant is not compatible with present fuel systems equipment. The severe fouling conditions caused by condensing of tar, pitch, and naphthalene, and coke, coal, and ash particulate, quickly fouls piping and in line devices. There is no pumping or compressing equipment technology, no flow metering technology that can operate under these condition with the reliability required for combustion safety in a boiler system.

The non-recovery system of this invention enables the volatiles from the coke ovens to be burned in power boilers to produce steam at a high efficiency. The process involves burning the volatiles in a combustion process designed to incinerate the volatiles and to minimize formation of pollutants that could form due to the chemical composition of the volatiles. The boilers efficiently extract the heat of combustion from the combustion products. The clean, cool products of combustion can be passed through suction fans to provide the suction required for the coke oven battery operation.

The proposed non-recovery cokemaking technology can be retrofitted to existing recovery coke ovens. Increased thermal efficiency and the relative greater value of power compared to coal chemicals makes such retrofits economically attractive. For new installations, the capital cost is much less than for the construction of a by-products plant.

SUMMARY OF THE INVENTION

In accordance with an aspect of the invention, a system for transporting and burning under negative pressure in a boiler, a raw coke oven gas to produce steam energy comprises:

i) a battery of coke ovens;

ii) a plurality of ascension pipes connecting the coke ovens to a raw coke oven gas collector main, the ascension pipes and collector main having means for spraying flushing liquor to cool the raw coke oven gases emitted from the coke ovens and collect sprayed flushing liquor in said collector main;

iii) a transport main for transporting flushing liquor and raw coke oven gas from the collector main to a burner of a steam producing boiler, the transport main including a downcomer for separating raw coke oven gas from flushing liquor;

iv) the burner supplying air for mixing with raw coke oven gas delivered by the transport main to effect burning of raw coke oven gas in the boiler and produce a boiler exhaust;

v) a suction fan being provided at an exhaust of the boiler to draw boiler exhaust from the boiler and develop thereby a negative pressure in the coke ovens, ascension pipes, collector main, transport main, burner and boiler, the boiler having reinforced walls of substantially gas-tight construction to withstand negative pressure, raw coke oven gas in said transport main is drawn through said burner by such negative pressure developed in said boiler by said suction fan;

vi) means for detecting a change in negative pressure in the system; and vii) a controller system for varying draw of the suction fan in response to a detected change in negative pressure in the system.

In accordance with another aspect of the invention, an apparatus for burning in a boiler, raw coke oven gas extracted under negative pressure from a battery of coke ovens, the apparatus comprises:

i) a negative pressure reinforced boiler with suction fan for exhausting combustion gases from the boiler with, ii) a burner introducing cooled separated raw coke oven gas under negative pressure for burning in the boiler, iii) means for controlling air to fuel ratio to said burner, and iv) means for varying negative pressure developed in said boiler by said suction fan.

In accordance with a further aspect of the invention, a process for transporting and burning under negative pressure in a boiler, a raw coke oven gas to produce steam energy comprises:

i) burning a cooled separated raw coke oven gas stream at a negative pressure by drawing combustion gases from the boiler with a suction fan.

BRIEF DESCRIPTION OF THE DRAWINGS

Various embodiments of the invention are described in detail with respect to the drawings wherein.

DETAILED DESCRIPTION OF THE PREFERRED EMBODIMENTS

Figure 1:
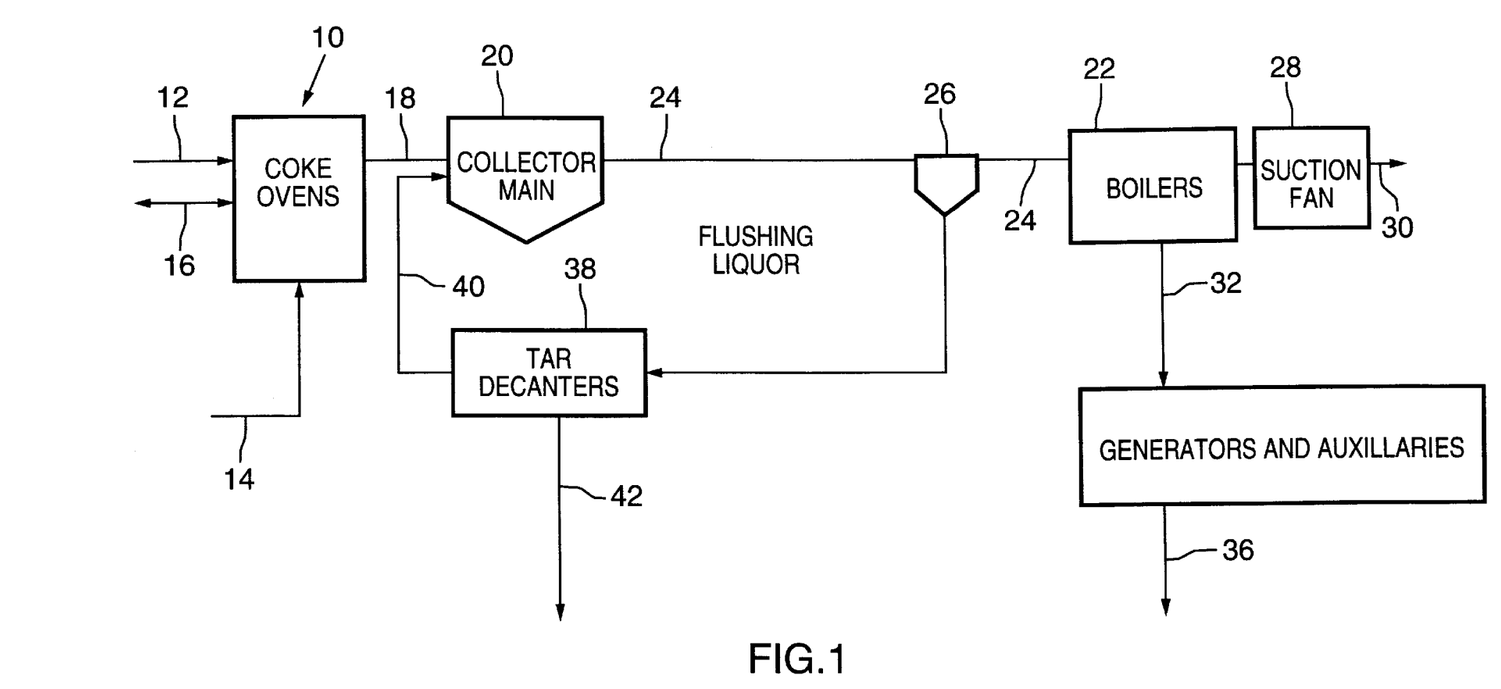
FIG. 1 is a flow diagram of the non-recovery coke oven gas power generation system.

FIG. 1 provides an overview of a preferred system of the invention for taking raw coke oven gases and burning them to produce steam which in turn powers auxiliaries. A battery of coke ovens 10 are fed with moist coal through line 12. Natural gas or some other suitable combustible is fed through line 14 and burned in the combustion chambers of the coke ovens to provide heat required to drive off the volatiles from the coal and thereby make coke. The produced coke is extracted from the ovens in line 16. This procedure with coke ovens, except for the use of natural gas in the burners, is very well understood and is common to coke ovens for steel making facilities around the world. The volatiles driven off from the coal proceed via an ascension pipe 18 to a collector main 20. Flushing liquors are used to cool the volatiles from the coke ovens. The collector main transfers the raw coke oven gas and flushing liquors towards the boilers 22 via the transport main 24. The flushing liquors are separated from the raw coke oven gas in the downcomer 26 and the raw coke oven gas transferred to the boilers. The raw coke oven gases are transported from the coke ovens to the burner of each boiler 22 by virtue of a suction fan 28 located at the exhaust of each boiler. The negative pressure developed throughout the system readily transports the raw coke oven gases to the one or more boilers where the boilers are reinforced to withstand the negative pressure developed therein. The suction fan exhausts combustion products produced by burning the raw coke over gases through line 30. The boilers generate steam in line 32 which is then used to drive generators and auxiliaries 34 to produce power in line 36. The flushing liquors are re-circulated from the downcomer. The tar and other debris is separated from the flushing liquor in the tar decanter 38 and the flushing liquor re-circulated in line 40. The tar from the tar decanters 38 is processed to a marketable grade of tar in line 42.

The system eliminates the majority of a standard by-products plant with substantial cost saving in respect of needed upgrades to existing by-product plants. The system may be retrofitted to existing coke oven facilities or in the development of new coke ovens, the system may be employed in place of the by-products plant. With suitable controls to be described with respect to FIG. 2, the system efficiently conveys raw coke oven gas for burning under negative pressure to produce power. It has been found that the ascension pipe array with collector mains and transport main and downcomer may be used in conjunction with this system having appropriate flow controls.

Figure 2:
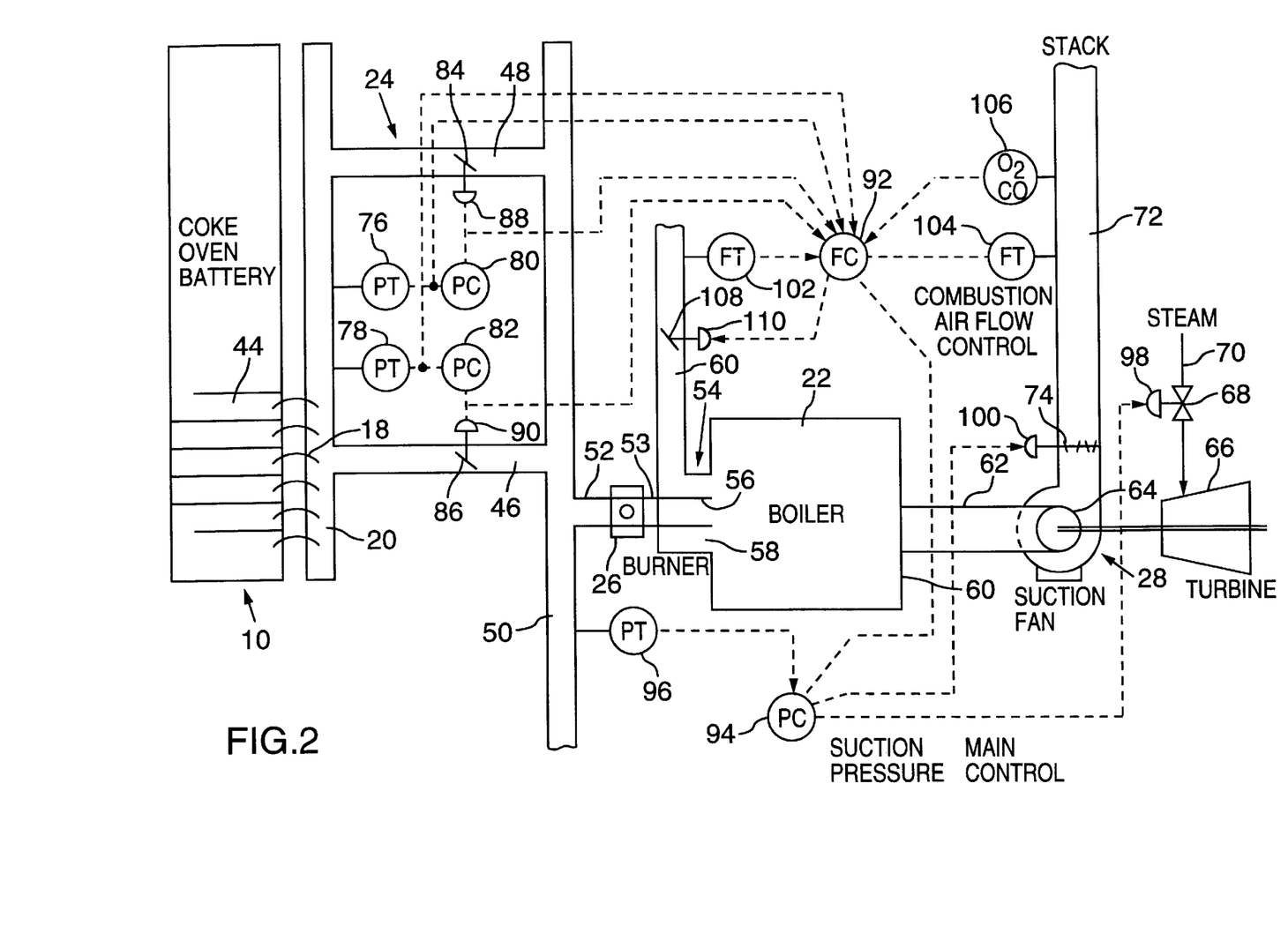
FIG. 2 is a schematic of the components for burning the raw coke oven gas in a boiler.

FIG. 2 shows further detail of the coke oven battery 10 having individual coke ovens 44 interconnected to the collector main 20 by the individual ascension pipes 18. In this particular embodiment, the transport main generally designated 24 comprises crossover mains 46 and 48 and suction main 50 leading to individual burner mains 52 which include a downcomer 26. It is understood that the suction main 50 may include two or more burner mains 52 to correspondingly supply two or more boilers 22. Two or more boilers would be used to provide for maintenance of the one or more boilers at any one time and as well backup in the event of sudden failure of one of the boilers and as well to handle excess raw coke oven gas which may arise from the coke ovens. It is quite feasible that both boilers may be designed at less than full capacity and therefore may operate in parallel to accommodate and burn all of the raw coke oven gas taken off of the coke ovens. The burner main section 53 delivers the raw coke oven gas to at least one burner 54 which comprises a raw coke oven gas nozzle 56 and a surrounding air inlet 58 where the air is supplied through line 60.

It is understood that most boiler designs include two or more burners. As will be described with respect to FIG. 6, the air in line 60 may be preheated in the boiler 22. A negative pressure is developed within the boiler 22 by way of the suction fan 28 which is connected to the exhaust 60 of the boiler by way of suction line 62 leading to the intake 64 of the suction fan 28. The suction fan may be driven by any suitable variable speed motor such as a steam driven turbine 66. The speed of the steam driven turbine 66 is controlled by valve 68 in steam line 70. The combustion gases from the boiler exhaust 60 are exhausted by the suction fan 28 through stack 72 which includes a variable damper 74. The suction fan 28 develops a negative pressure in the boiler which through the burner main 52 is developed in the suction main 50, cross over 46 and 48, and collector main 20. The negative pressure in the collector main 20 is transferred via the ascension pipes 18 to the individual coke ovens 44 to develop the desired negative pressure in each coke oven. A balance is required in the degree of negative pressure developed in the coke oven. By virtue of the coke oven construction, they tend to leak volatiles. In order to reduce or eliminate volatile emissions, a negative pressure in each coke oven results in a slight ingress of air to the coke ovens. However, the ingress of air must be minimized, otherwise the coke and gases are burned thereby lowering coke oven efficiency and in severe cases damaging the accession pipe and collector main. The control system provides the desired negative pressure in the coke oven which is normally in the range of less than 1 inch of water.

In order to indirectly measure the negative pressure in the coke ovens, pressure transducers 76 and 78 measure the negative pressure in the collector main 20 where the gases have been cooled. Pressure controllers 80 and 82 are in communication with the pressure transducers 76 and 78. In response to a detected change in pressure detected by the transducers 76 and 78, the pressure controllers adjust the back pressure control valves 84 and 86 to adjust the negative pressure in the coke ovens. The pressure controllers 80 and 82 are in communication with valve actuators 88 and 90 which position the valves 84 and 86. The pressure controllers 80 and 82 control to a set point which may manually or remotely set. When the pressure controller 80 and/or 82 detects an error signal relative to the set point, the respective controller opens or closes the respective valve 84 and/or 86 by the respective valve actuator 88 and/or 90. The direction of valve movement to the open or closed position depends upon the error signal moving in a more negative direction or a more positive direction.

The most significant factor which can change the negative back pressure in the collector main 20 is the flow rate at which the coke oven gases are emitted from the coke ovens. During the initial coking period, considerable volumes of volatiles are emitted by the coke ovens which tend to make the back pressure in the collector become less negative. The pressure controller means moves the back pressure valve to a more open position to maintain the desired negative pressure in the coke ovens. As the coking process proceeds, the flow rate of volatiles decreases thereby tending to make the pressure more negative in the collector main so that the pressure controller moves the back pressure valve to a less open position.

The pressure controllers 80 and 82 are in communication with the flow controller 92 and as well the readings from the pressure transducers 76 and 78 are also received by the flow controller 92. The flow controller relies primarily on the position of each back pressure valve and the pressure difference across them in providing a feed forward control for adjusting the air flow to the boiler 22. There is also a pressure controller function via pressure controller 94 which senses the negative pressure in the suction main 50 by way of pressure transducer 96. The pressure controller controls, by way of valve actuator 98, the steam pressure delivered to turbine 66 to control the fan speed of suction fan 28. In addition, the pressure controller 94 also controls the position of variable damper 74 through actuator 100. The pressure transducer 96 detects a change in negative pressure in suction main 50. Pressure controller 94 is programmed to maintain a constant negative pressure in the suction main 50 and immediately moves the damper 74 towards the open or close position to change draw by the suction fan 28 when a change in negative pressure is detected. This provides a rapid response to change in suction main pressure. The controller 94 also commences changing the suction fan speed as needed so that the damper 74 tends to move to its normal operating position. It is understood that the pressure controllers 80, 82 and 94 and flow controller 92 may be part of a central controller system.

The pressure controllers 80 and 82 indirectly provide for finite adjustment of the negative back pressure in the collector main 20 while the pressure controller 94 maintains a greater negative pressure in suction main 50 to thereby control the back pressure in the collector main 20 and the respective coke ovens of the battery 10. In the event that the negative pressure in collector main 20 tends to fall rapidly due to excessive generation of volatiles from the coke ovens, the pressure controllers 80 and 82 open the valves 84 and 86. This results in a sudden drop in pressure in suction main 50 which is detected by the pressure transducer 96. The pressure controller 94 is programmed to immediately open the variable damper 74 to increase negative pressure in line 50 and at the same time increase speed of the suction fan 28 by increasing steam pressure to turbine 66 through variable valve 68. Changes in collector main pressure and back pressure valve position are also used as feed forward signals to controller 94 from controller 92. This activates the controller 94 to begin to respond to the production of coke oven gases before there is a change in suction main pressure. Should such action fail to achieve the desired negative pressure in suction main 50, the pressure controller first attempts to achieve the correct pressure by varying the opening of the damper 74. By co-ordination of the pressure controllers 80, 82, 92 and 94, the desired negative pressure in the coke ovens is maintained and hazards of emissions and coke combustion minimized in the coke oven battery.

The flow controller 92 receives input from mass flow rate transducer 102 in air line 60 and mass flow rate transducer in exhaust stack 72. The flow controller 92 also receives input from the oxygen and carbon monoxide transducers 106. The flow controller, based on these inputs as well as the input from pressure transducers 76 and 78, determines the mass flow rate of air required in line 60 and achieves it by way of variable valve 108 driven by valve actuator 110.

The provision of a reinforced gas-tight boiler 22 which is capable of burning the raw coke oven gases under negative pressure considerably facilitates the control of the air to fuel ratio to ensure complete combustion of the raw coke oven gases in the boiler 22. As is appreciated by those skilled in the art, the general understanding in combustion engineering for purposes of burning coke oven gas is that the gas flow must be metered for the purpose of controlling combustion air to fuel ratio for safe and efficient combustion. It is also appreciated that the tar and other dirty constituents have to be removed from the coke oven gas and that the negative pressure of the coke oven gas needs to be increased to a positive pressure not only for injection through the burner of the boiler, but also to permit gas flow measurements in controlling the air to fuel ratio. This would necessitate mass flow rate sensing valves in the raw coke oven gas lines which, under normal operating conditions, would immediately clog and be rendered useless.

A significant benefit of this invention, which burns the raw coke oven gases under negative pressure in the boiler, eliminates the need to measure mass flow rates of raw coke oven gases by virtue of the intercommunication of the pressure transducers and mass flow rate transducers.

Three different inputs may be monitored by the flow controller 92 to ensure complete and safe combustion of raw coke oven gases by controlling the air to fuel ratio to be within the necessary range. Such control also eliminates or minimizes CO emissions and reduce amount of excess oxygen in the stack emissions. This principle can be best illustrated by the mass balance equation:

$$\frac{\text{Air Flow}}{\text{Fuel Flow}} = \frac{\text{Air Flow}}{\text{Exhaust Flow} - \text{Air Flow}}$$

A significant input in calculating the air to fuel ratio through the burner 56 is the difference between the mass flow rate measured by the flow transducer 104 and the mass flow rate of air in flow transducer 102, to get close to the optimum air to fuel ratio. The next significant input is the change in position of the back pressure control valves 84 and 86. A movement of these control valves towards a more open position signals an increased mass flow rate of coke oven gases emitting from the coke ovens. The third input which is relied on to fine tune the air to fuel ratio is the measurement of oxygen and carbon monoxide concentrations in the stacked gases. The flow controller 92 establishes that the air to fuel ratio is within a specified range and any fine tuning to that ratio is attended to by virtue of the input from oxygen and carbon monoxide sensor 106. In the event that there is a change in position of the back pressure control valves 84 and 86, which would signal either an increase or decrease in mass flow rate of coke oven gas, the flow controller can adjust the mass flow rate of air in line 60 by correspondingly opening or closing the valve 108 through actuator 110. Accordingly, the flow controller can lead sudden changes in coke oven gas mass flow rates, as signalled by changes in positions of valves 84 and 86 so that the flow controller does not underly lag in attempting to maintain the air to fuel ratio in the desired range. Continued fine tuning of the air to fuel ratio is adjusted based on the input from the oxygen and carbon monoxide detector 106 where the valve 108 is slightly biased in favour of moving the air to fuel ratio in the correct direction of control.

Figures 3, 4:
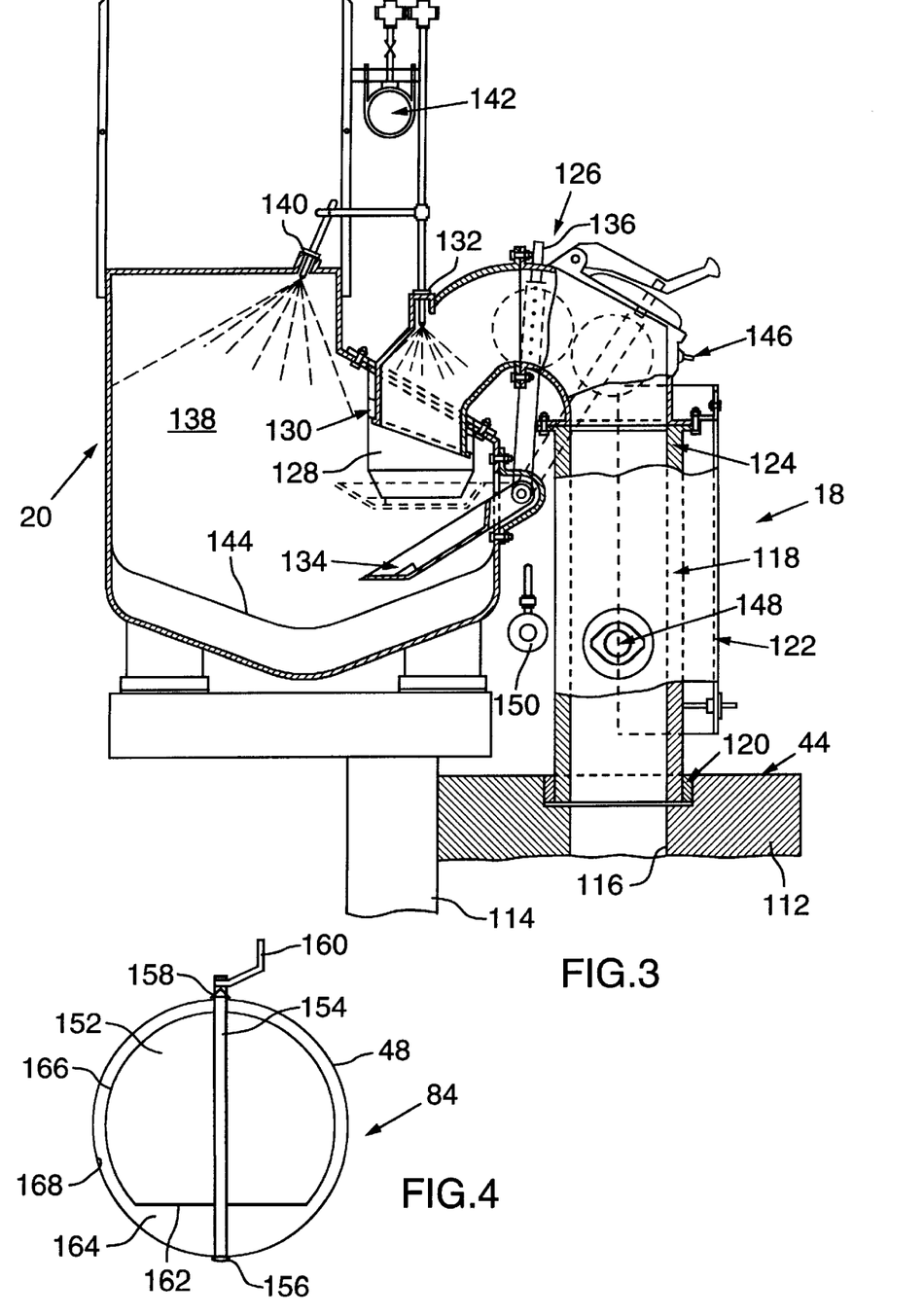
FIG. 3 is a section through the ascension pipe and collector main above the coke ovens.
FIG. 4 is an elevation of a valve in the transport main for controlling flow of raw coke oven gas from the coke ovens.

FIG. 3 shows the standard details of an ascension pipe 18 and a section through the collector main. The ascension pipe is located above a coke oven 44 having a top wall 112 and side wall 114. The brick work of the top wall 112 has an opening 116 to which the stand pipe 118 is connected by way of a seal 120. The stand pipe 118 is surrounded by a heat shield 122 and has a refractory lining 124 to withstand the highly corrosive temperatures of the raw coke oven gases rising through the opening 116. The rising coke oven gases are diverted by elbow 126 in a downward direction into the collector main 20. The elbow 126 terminates at opening 128 and is sealed to the collector main body by asbestos rope seal 130. The gases in elbow 126 are encountered by downwardly directing liquor spray 132 which commences the cooling of the hot raw coke oven gases. The spray is directed towards the collector main to avoid liquor entering the coke oven. The gases and flushing liquor from the spray 132 flows out of the outlet 128 and over a flapper valve 134 which can be opened and closed by lever 136 to form a liquor seal valve at the outlet 128 of the ascension pipe 18. The flushing liquor is also sprayed into the interior 138 of the collector through flushing liquor spray nozzle 140. The flushing liquor spray nozzles 132 and 140 derive the flushing liquor from the flushing liquor header 142.

Figure 5A:
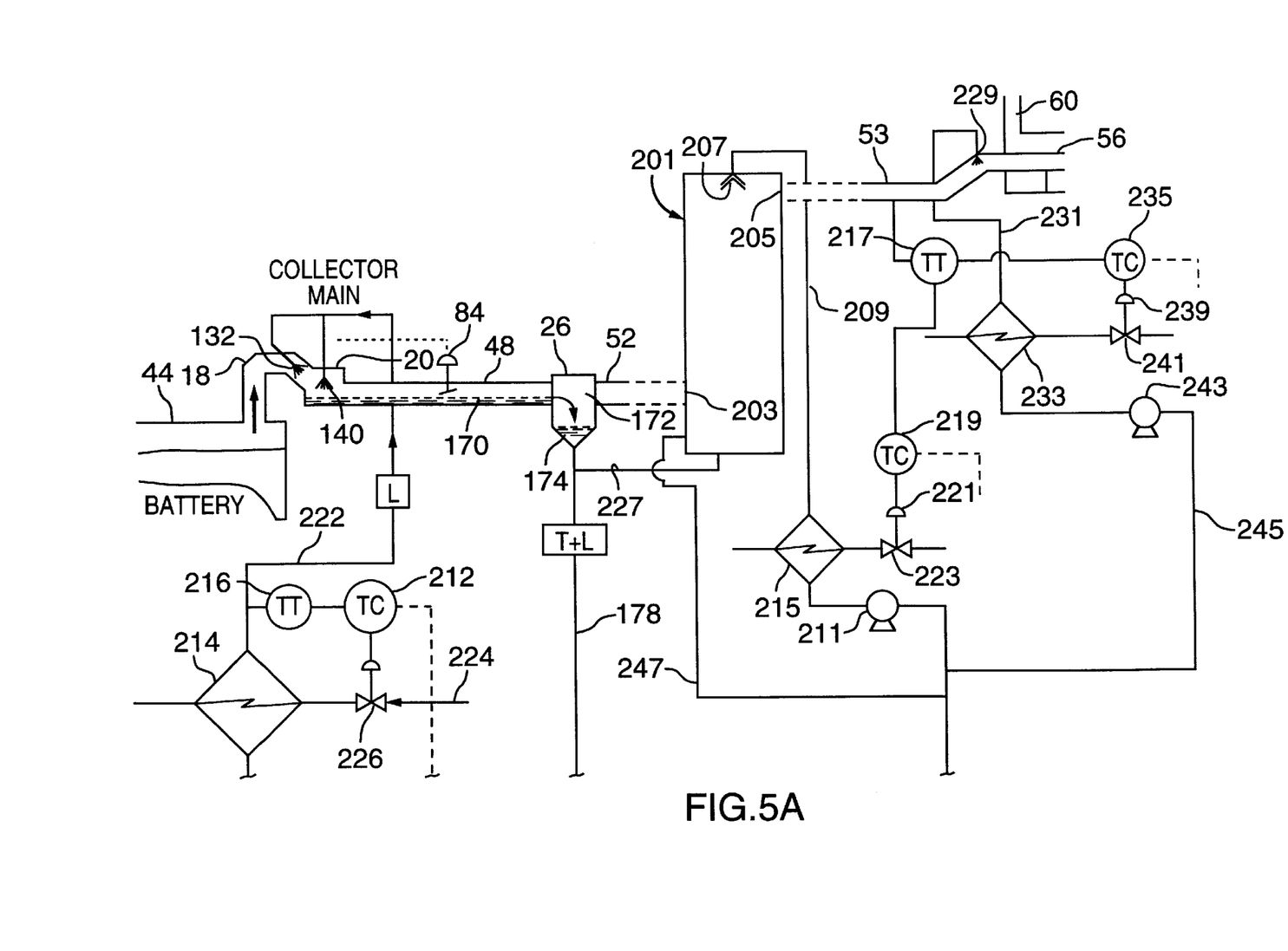
FIGS. 5A and 5B are schematics of the components for separating flushing liquors from the raw coke oven gases and recycle of the flushing liquor.
Figure 5B:
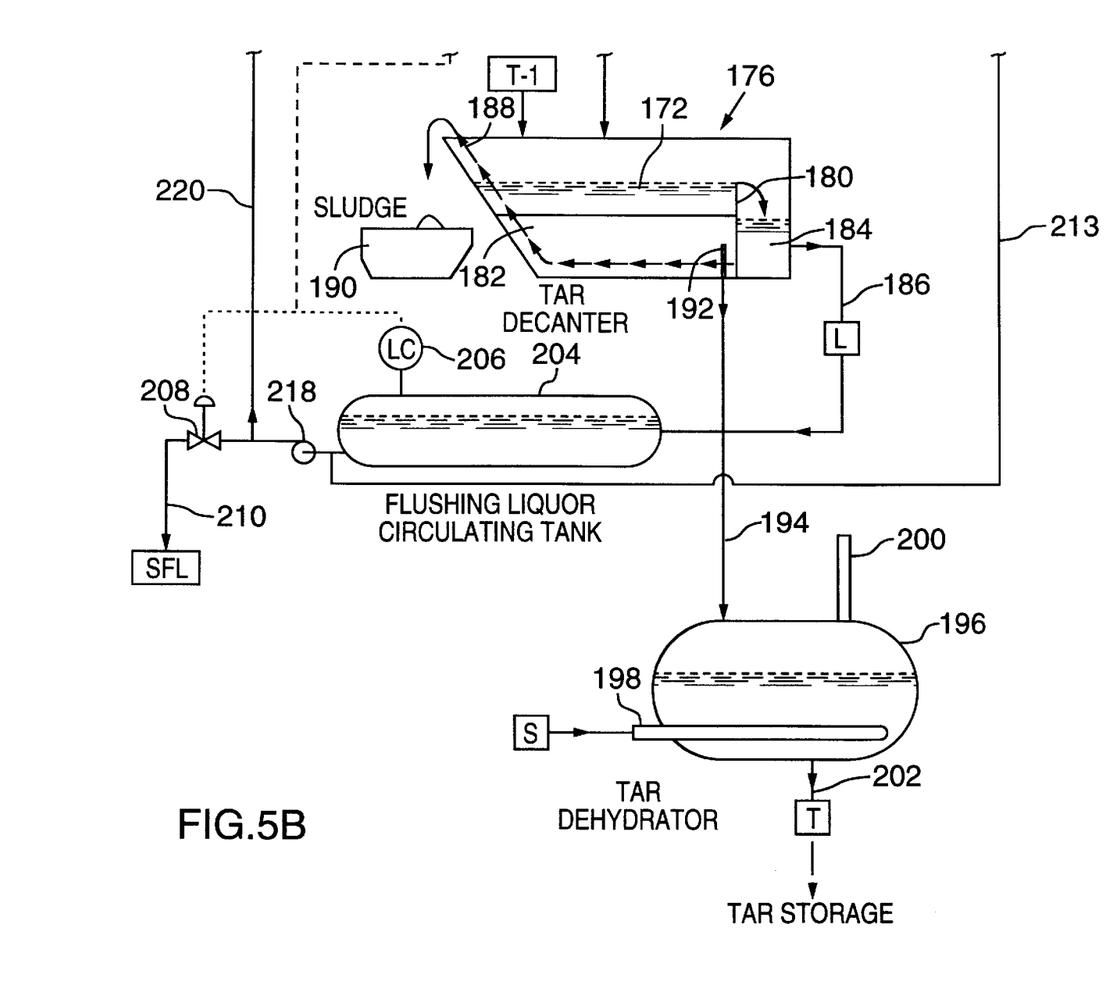

The flushing liquor is re-circulated from a flushing liquor re-circulation system and is introduced to the header 142 under pressure from the system to be discussed in respect of FIG. 5. The raw coke oven gases are cooled by the flushing liquor sprays from approximately 2,000° F. at the outlet 116 of the coke oven to approximately 200° F. within the collector main space 138. The flushing liquor along with condensables such as tar and the like and solids fall to the base 144 of the collector main and travel along the sloping surface of the collector main towards the crossovers 46 and 48.

During the discharging of coke from the coke ovens, the liquor seal valve 134 in each ascension pipe is closed in the normal manner as commonly employed in operating batteries of coke ovens. With the valve 134 closed, air is not sucked into the suction main which would cause combustion of the coke oven gases. During charging of coal into the oven, the valve 134 is opened and the steam aspirator 146 is operated to assist in drawing coke oven gas out of the oven and directing them into the collector main 20. Steam for the steam aspirator and steam out connection 148 are provided in steam header 150.

As described with respect to FIG. 2, a standard representative back pressure valve 84 is shown in FIG. 4. The valve which is located within the crossover main 48 and comprises a butterfly valve plate 152 mounted on spindle 154. The spindle is mounted vertically in the corresponding crossover main 48 by use of suitable bearings 156 and 158. The spindle 154 can be rotated in the bearings 156, 158 by movement of lever arm 160. The plate 152 is truncated at the bottom to define a lower planar edge 162 and provides a space for flowing liquors in region 164 of the crossover main 48. The plate 152 has a perimeter edge 166 spaced from the interior 168 of the crossover main 48. This allows for some accumulation of tar deposits and the like on the interior of the crossover main while allowing movement of the butterfly plate 152. The valve actuator 88, as controlled by the pressure controller 80, is connected to lever arm 160. By moving the lever arm, the butterfly plate 152 is moved within the collector main 48 to vary the cross-sectional opening within the main 48 and thereby determine the desired negative pressure in the collector main 20, as monitored by the pressure transducers 76. The degree of movement of the back pressure valve 84 is monitored by the flow controller 92 by virtue of the interconnection of the pressure controller to the flow controller. As previously described, this movement is factored into the overall control of the air to fuel ratio for the boiler 22 and as well by communication between control 92 and 94, the controller 94 can anticipate negative pressure needs in the mains.

Another advantage of the negative pressure system for delivery of the coke oven gases to the boiler burner is the control of surplus flushing liquors. The flushing liquor recirculating system may be designed to eliminate surplus flushing liquor for discharge, or at least minimize surplus flushing liquor during the continuous operation of the coke oven gas combustion system. The flushing liquor recirculating system may be made up of one or more embodiments as illustrated in FIG. 5. The embodiments, which may function separately or together, include temperature control for flushing liquors sprayed in the ascension pipe and collector main, temperature control for flushing liquors sprayed into a cooling tower and temperature control for flushing liquor sprayed into the burner main. Each of these embodiments may be used independently or in conjunction with one or more of the other embodiments to control the temperature of the gas stream and thereby determine the relative humidity in the gas stream. By controlling the temperature in the gas stream, and the amount of water that is carried therewith to the burner, one may at the same time control the level of flushing liquor in a storage tank of the recirculating system. In accordance with an aspect of the invention, the first embodiment in the temperature control of the flushing liquor is described with respect to FIG. 5. The ascension pipe 18, as connected to a coke oven 44, delivers the raw coke oven gas to the collector main 20. The usual sprays in the downward section of the ascension main and the collector main are provided at 132 and 140. The positioning of the back pressure valve 84 is shown in the crossover main 48. The crossover main 48 leads into the suction main where a downcommer 26 is positioned to separate the flushing liquor 170 travelling along the bottom of the various mains from the raw coke oven gases in upper space 172 of the downcommer 26. The raw coke oven gases are drawn from the space 172 to within the burner 56 by way of the negative pressure developed within the boiler 22. The necessary air for the combustion of the raw coke oven gases introduced to the burner 54 is supplied in line 60. As discussed with respect to FIG. 2, the boiler 22 has at its exhaust 60, a suction fan 28 for exhausting the combustion products up the stack 72.

The spent flushing liquor 170 is transferred from the bottom 174 of the downcommer to a tar decanter 176 via line 178. The tar decanter 176 includes a weir 180 which provides for settling and separation of tar and debris from the flushing liquor. The tar and debris is more dense and settles in region 182, whereas the flushing liquor 170 flows over the weir 180 into chamber 184 and out of the tar decanter 176 through line 186. Sludge which settles to the bottom of settling region 18, is conveyed from the base of the tar decanter 176 and out the decanter by scrapers moving in the direction of arrows 188 where the sludge is trapped in sludge pot 190. The tar is removed from the tar decanter by riser 192 which transfers the tar in line 194 to a tar dehydrator 196. A heater 198 heats the tar to drive off water vapour through stack 200. The tar is then transferred through line 202 to a suitable tar storage. The flushing liquor as transferred in line 186, is stored in flushing liquor storage tank 204 where a level controller 206 measures the level of the flushing liquor in the storage tank 204. In normal operation of a coke oven by-products plant excess flushing liquor in tank 204 would be discharged by the level controller 206 opening valve 208 and discharging the surplus flushing liquor through line 210. The surplus flushing liquor is very toxic and has a very high organic content, hence requiring extensive treatment before release to the environment.

It has been found however, that by virtue of the direct transfer of the raw coke oven gases to the boiler under negative pressure, a significant advantage can be achieved in that dispensing of surplus flushing liquor is virtually eliminated and for most of the operation, will be eliminated. This significant advantage is realized by way of the level controller 206 being in communication with a temperature controller 212 for a flushing liquor temperature regulating system 214. As discussed with respect to FIG. 2, by developing a negative pressure throughout the system and transferring the raw coke oven gases directly to the boiler 22, there is no need to compress the raw coke oven gases before introduction to the burner 56 and hence no need to cool and dry the gas before compression. Furthermore, the burner can accommodate, by virtue of this system, varying moisture levels in the raw coke oven gases. At steady state, the spray of flushing liquor into the downspout of the ascension pipe and into the collector main, as a function of coke oven gas temperature, will provide a reasonably consistent degree of cooling of the coke oven gases and hence, determine the amount of moisture that is retained in the coke oven gases as they are transported to the burner 56. By changing the temperature of and/or the spray volume of the flushing liquor, one could then vary the extent of cooling of the raw coke oven gases and thereby vary the amount of moisture carried in the coke oven gases. The purpose of the temperature regulator 214 is to vary the temperature of the flushing liquor introduced to the hot raw coke oven gases. The level controller 206 is in communication with the temperature controller 212. The temperature controller monitors the temperature of the flushing liquor through temperature transducer 216. The flushing liquor is pumped out of the flushing liquor storage tank 204 by pump 218 and is transferred via line 220 to the temperature regulator 214. The flushing liquor after passing through the device 214 is transferred in line 220 to the flushing liquor header 142, as shown in FIG. 3.

At steady state, the level of flushing liquor in the tank 204 should remain fairly constant. Water, however, is brought into the system by virtue of the coal containing significant amounts of moisture which is driven off with the volatiles from each coke oven and steam injection at various points in the system also adds to water uptake. Excess moisture introduced to the system from the coal was the primary source of surplus flushing liquor normally dispensed through line 210. However, with the advance of this invention, the dispensing of surplus flushing liquor can be avoided.

The level controller 206 determines variations in the level of flushing liquor in the tank 204. Usually, in the normal by-product plant, the level of the flushing liquor in the tank will increase as more and more moisture is introduced to the system from the heated coal. However, by virtue of this invention, that excess moisture may now be retained in vapour form in the raw coke oven gases and dispensed through the boiler 22.

In this particular embodiment, such control may be achieved by controlling the extent of cooling of the raw coke oven gases by altering the temperature and/or valume of the flushing liquor sprays 132 and 140. Depending upon the type of temperature regulating device 214, the temperature controller can increase or lower temperature of the flushing liquors exiting the device 214 in line 220. The device 214 may be a liquid to liquid heat exchanger, a liquid to gas heat exchanger where cooling air is used to vary the temperature of the flushing liquor or by indirect evaporative cooling, such as in a cooling tower where flushing liquor inside tubes is cooled by water spray on the outside of the tubes and air flow across the wet tubes.

For purposes of illustrating an embodiment of the invention, a liquid to liquid heat exchanger is shown at 214. The flow of the heat exchange medium in line 224 is controlled by valve 226 which thereby controls the flow rate of the heat exchange medium through the heat exchanger 214. In the event of the level controller 206 sensing a rise in liquid level in the tank 204, the temperature controller receives this signal and varies the flow of the heat exchange medium in line 224 to increase the temperature of the flushing liquor in line 222. By increasing the temperature of the flushing liquor, the sprays from spray nozzles 132 and 140 will have less of a cooling affect on the hot raw coke oven gases. Hence, the temperature of the raw coke oven gases leaving the collector main will be at a higher temperature. The higher temperature gases carry more water vapour, which is transported directly to the burner of the boiler 22 and is carried out with the exhaust gases in stack 72. As more and more water vapour is removed, with the warmer raw coke oven gases, the flushing liquor level in tank 204 will drop until a predetermined level is attained in tank 204. At this point the level controller 206 signals the temperature controller 212 to slightly increase the cooling effect on the flushing liquors so that the cooler flushing liquors slightly reduce the temperature of the raw coke oven gases and hence, carry less water vapour to the burner 56. The level controller 206 and temperature controller 212 continued to vary the amount of cooling medium delivered to the heat exchanger 214 to keep the level of flushing liquor in the tank 204 within a predetermined level range. The temperature controller 212 through temperature transducer 216 also monitors the temperature of the flushing liquors in line 222 which provides the necessary feedback to the temperature controller 212 in modulating the valve 226.

It is understood that depending upon the temperature of the flushing liquor in tank 204, instead of cooling medium in line 224, it may be necessary to use a heating medium. Heating of the flushing liquor could also be achieved in the tar decanter 176 or in flushing liquor tank 204. Such a change in temperature may be caused by environmental factors, seasonal changes in temperature and the like. By use of this temperature controller with level controller in the flushing liquor tank and the heat exchanger 214, one is now able to eliminate from the flushing liquor re-circulating system, spent or surplus flushing liquor. Instead, the contaminants which would normally be carried out with the spent flushing liquor are now delivered to the burner 56 for combustion, leaving carbon dioxide and water vapour to be expended through the stack 72.

It is appreciated that the flushing liquor 170 in cross-over main 48 can only be cooled to a certain extent by the flushing liquors sprays in the ascension pipe and collector main. If the flushing liquors with tar are cooled excessively, the tars will congeal and hence block the flow along the cross-over main and other piping into the down-comer 26. A desire to cool the coke oven gases to reduce the amount of moisture carried to the burner may be limited by the minimum temperature for the flushing liquors 170. Usually the flushing liquor temperature is in the range of about 170° F. to 200° F. If this extent of cooling is not adequate to control the moisture level in the coke oven gases and maintain a desired flushing liquor level in tank 204, there are several options to consider. For example, one could operate the system until the flushing liquor level falls to a predetermined level and then add make-up water which is preferably demineralized to minimize chances of forming an emulsion with the tars. Alternatively, one could provide additional cooling of the gases. For example, two additional flushing liquor sprays may be used downstream of the tar separation phase at downcomer 26 to further cool the coke oven gas temperature and hence reduce the moisture level therein. As shown in FIG. 5, two additional cooling systems are provided which may be used individually or together with the flushing liquors sprays in the ascension pipe and collector main. Optionally, positioned in the burner main 52 is a secondary counter-flow cooling tower 201 with an inlet 203 and an outlet 205. The coke oven gases flow upwardly of the tower through the outlet 205 into the burner main 54. Directed downwardly of the tower 201 is a flushing liquor spray 207. The flushing liquor for spray 207 is supplied under pressure in line 209. The flushing liquor is drawn from the outlet of the flushing liquor tank 204 by pump 211 along line 213. The pump forces the flushing liquors through the temperature regulator device 215. As with the temperature regulator device 214, a temperature transducer 217 monitors the temperature of the coke oven gas in line 209 with a signal to the temperature controller 219. At this stage of the system, the gas temperature is measured instead of flushing liquor temperature, because there may be a considerable difference between flushing liquor temperature and gas temperature. The temperature controller, in turn, directs the valve actuator 221 to adjust the position of valve 223 to control the extent of cooling in the temperature regulator device 215. The temperature controller is in communication with the level controller 206 and functions in the same manner as the temperature controller 212. By adjusting the cooling in the temperature regulator 215, the flushing liquor in line 209 is sprayed into the tower 201 to effect the desired extent of cooling in the coke oven gases before re-entry to the burner main section 53. The flushing liquor is collected at the bottom 225 of the tower 201 and returned via line 227 to the downcommer line 178. The flushing liquor may be sufficiently depleted of tar that the liquors can be returned to line 213 via line 247.

Figure 7:
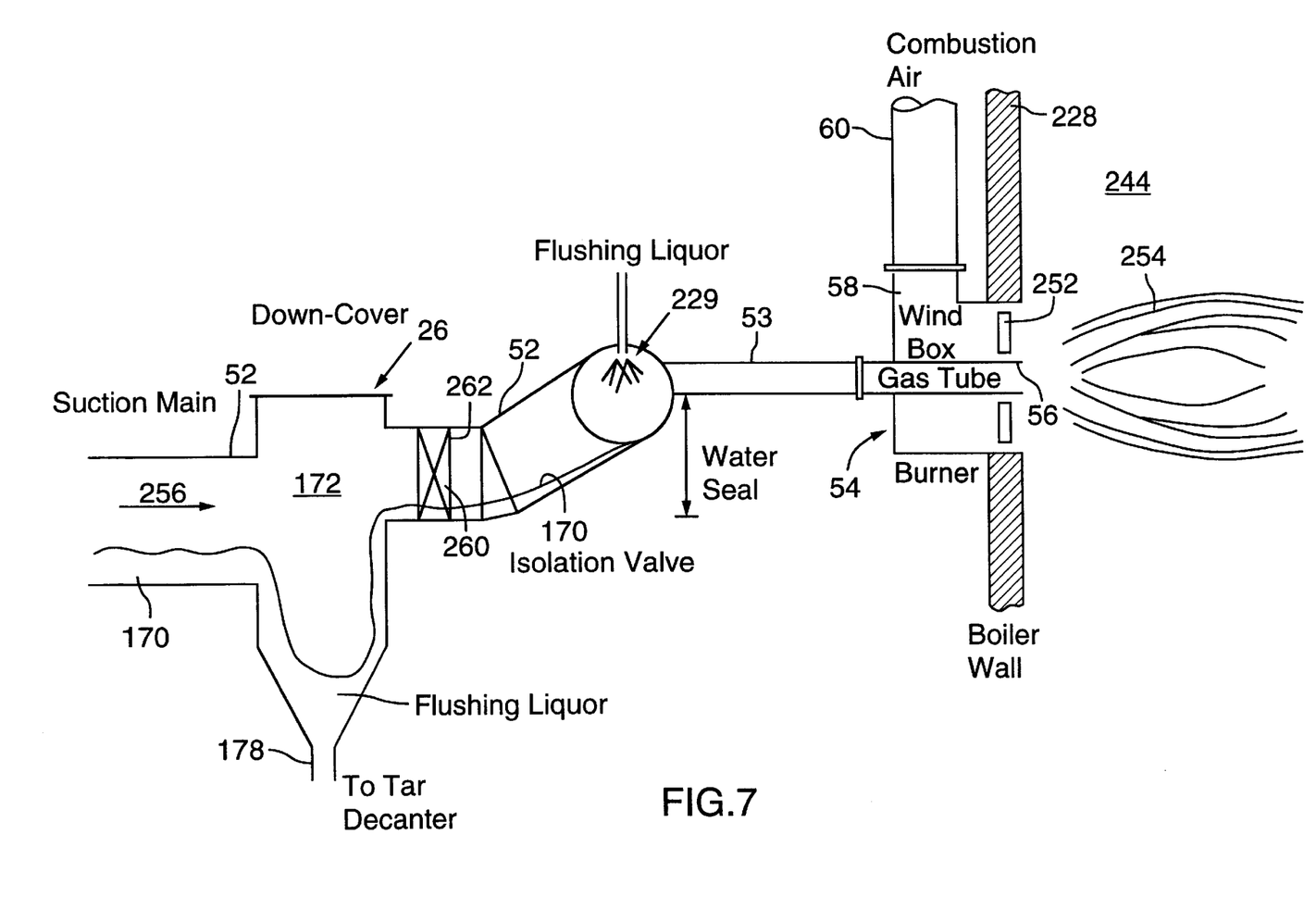
FIG. 7 a schematic of the juncture of the transport main to the burner of the boiler.

A further embodiment for effecting cooling of the coke oven gases and which is shown in more detail in FIG. 7, comprises flushing liquor sprays 229 just before the burner nozzle 56. The spray is directed downwardly of the burner main section 53 to not only wash the solids and other particulates away from the burner nozzle, but as well to effect additional cooling of the coke oven gases and thereby further control the moisture level in the coke oven gases. As with the cooling tower 201, the flushing liquor spray through nozzle 229 is supplied in line 231 which passes through the temperature regulator 233. The temperature regulator is controlled by temperature controller 235 which senses the temperature of the coke oven gases in line 53 through temperature transducer 217. The temperature controller, by actuator 239, controls the position of valve 241. The temperature controller 235 is in communication with the level controller 206. The flushing liquor is supplied to the temperature regulator 233 through pump 243 which draws flushing liquor in line 245 from line 213. The flushing liquor in burner main section 53 is collected and returned to the downcomer line 178 or line 245.

It is appreciated that the spray volume of flushing liquor may also be controlled to vary the coke oven gas temperature. The volume of spray may be controlled by actuators opening and closing valves to control flow rate to the spray nozzles. The extent of cooling by changing spray volume is limited by, for example, number of spray nozzles and maximum spray flow rate for each nozzle.

By virtue of the various embodiments for achieving coke oven gas temperature control, the relative humidity of the coke oven gas is adjusted to ensure that there is minimal or virtually no surplus flushing liquor during the continuous operation of the system. The coke oven gas temperature may be controlled by the primary system in combination with secondary and/or tertiary cooling systems embodied in the tower 201 and in the burner main 54. The temperature controllers 212, 219 and 235 may operate in conjunction with the level controller 206 to achieve the necessary control of coke oven gas temperature while maintaining the desired level of flushing liquor in the flushing liquor 204. At the same time, the primary with secondary and/or tertiary cooling systems ensure that the flushing liquor carrying heavy loadings of tar are not cooled to a temperature which results in the tar congealing and clogging up flushing liquor flow in the respective mains.

Figure 6:
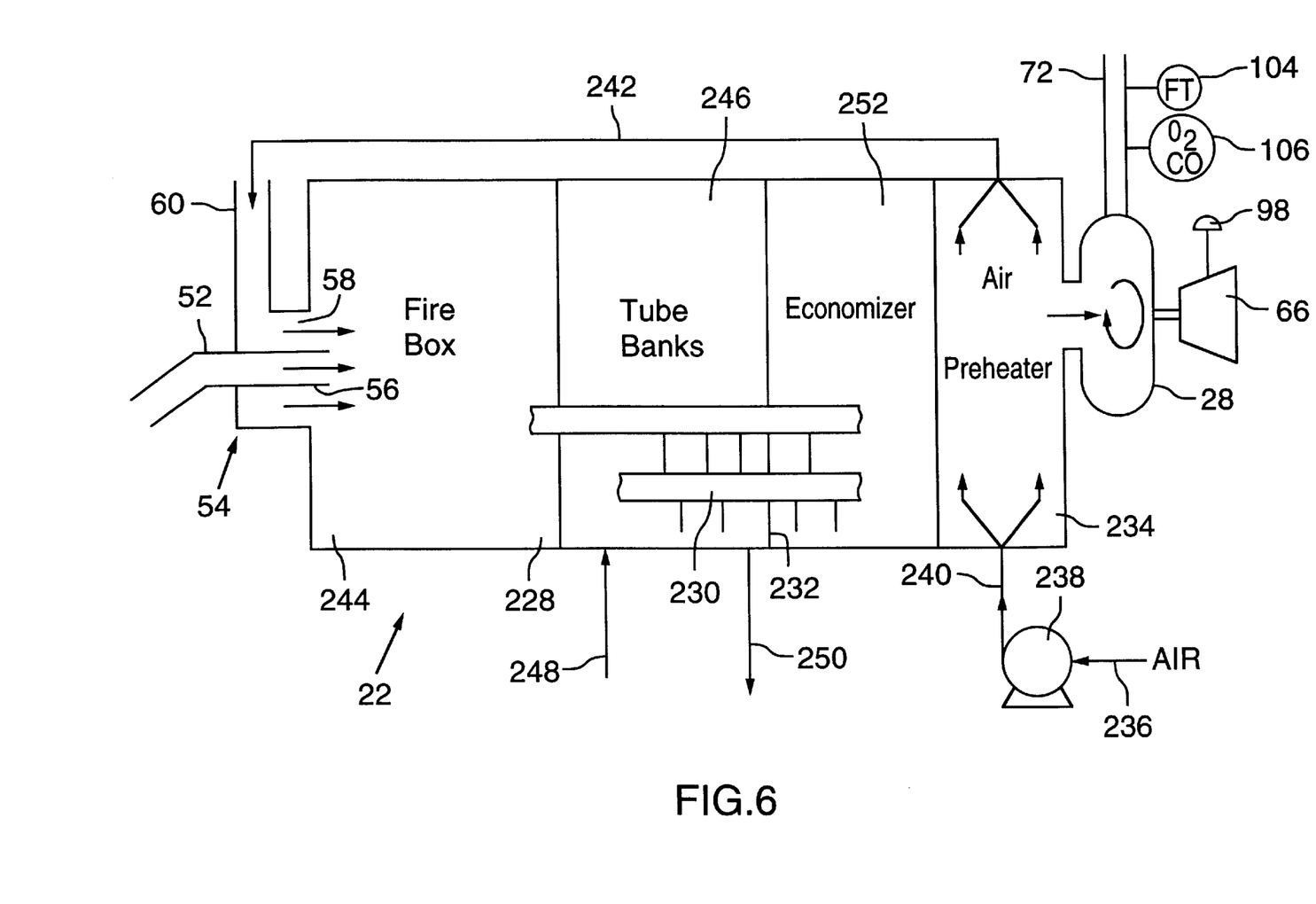
FIG. 6 is a schematic of the boiler and suction fan for developing negative pressure in the system.

The boiler 22 is shown schematically in somewhat more detail in FIG. 6. The walls 228 of the boiler are reinforced with reinforcing members 230 and 232. This permits the boiler to operate under a negative pressure, as determined by the suction fan 28. In addition, the boiler walls are substantially gas tight to ensure that the negative pressure in the boiler is maintained by preventing any significant ingress of air. It is understood that the wall construction should be as gas tight as possible to avoid loss of power due to overdriving the suction fan and to avoid any significant upset in controlled negative pressure in the boiler. The negative pressure in the boiler may be in the range of 15 to 30 inches of water in order to ensure sufficient negative pressure throughout the remainder of the system. As is standard with boiler construction, the boiler 22 has at the downstream end an air preheater 234. Fresh air or some other source of air in line 236 may be compressed in blower 238 and travels along lines 240 through the air preheater 234 to provide preheated air in line 242 which leads to the air conduit 60 for the burner 54. As will be discussed with respect to FIG. 7, the preheated air in line 60, as modulated by the valve 108 of FIG. 2, is mixed with the coke oven gas injected by burner nozzle 56 to provide a flame in the firebox 244. The negative pressure within the firebox draws the raw coke oven gas in through the burner nozzle 56 and as well, the heated air through the plenum 58. It is understood that the air is introduced to the plenum 58 at a pressure which ensures that a negative pressure is always developed in the fuel nozzle 56 and transferred through burner main 52 to the remainder of the system. The pressure of the air entering plenum 58 is hence, greater than the negative pressure within the firebox. Depending upon the pressure drops in the air supply, it is understood that there may be a sufficient negative pressure in the boiler to draw sufficient mass flow of air into the firebox 244 in meeting the predetermined air to fuel ratio and thereby avoid the need for blower 238.

The heat of combustion from the firebox travels over the usually fire box wall tubes and through the tube banks 246 where steam is generated in the usual manner within the tubes. Boiler feed water enters via line 248 and the high temperature steam exists the tube banks via line 250. It is understood that an economizer 252 may be included in the boiler set-up to extract further heat from the combusted gases. The steam in line 250 is delivered to a generator or the like where the energy in the steam in line 250 is converted into electricity or mechanical power.

The particulars of the downcomer and burner set-up, in accordance with a preferred embodiment of the invention, are shown in FIG. 7. The burner 54 has the burner nozzle 56 positioned within the air plenum 58. Line 60 provides air to the plenum 58 which flows over the nozzle 56 through annular grating 252. The burner 54 is positioned within the reinforced boiler wall 228. The raw coke oven gas, as brought into the firebox 244 by the negative pressure within the firebox, is ignited in the presence of the air entering through the grate 252 to provide a combustion zone 254. The transport main has burner main 52 in which the downcomer 26 is provided. The raw coke oven gas flows in main 52 in the direction of arrow 256. The flushing liquor 170 is separated from the raw coke oven gas in region 172. The raw coke oven gas flows upwardly of main 52 where flushing liquor may be introduced at spray nozzle 229 of main 52 to remove any tar constituents and particulates which settle out on the interior of the main 52. The sprayed flushing liquor 170 flows downwardly towards the downcomer upper region 172. The raw coke oven gases continue through line 52 into the burner 56. An isolation valve 260 is provided in line 53 which may be closed and sealed by continuing to spray flushing liquor into line 52 until the level of the flushing liquor is above the level of the upper portion 262 of the isolation valve. It is necessary to provide an isolation valve with water seal any time the burner 56 is shutdown for maintenance or cleaning or is shut down by combustion safety control limit failure.

As described with respect to FIG. 5, the flushing liquor spray at 229 may also be relied on to effect further cooling of the gases in achieving an overall water balance and avoid thereby surplus flushing liquors.

Although preferred embodiments of the invention have been described herein in detail, it will be understood by those skilled in the art that variations may be made thereto without departing from the spirit of the invention or the scope of the appended claims.

I claim:

1. A system for transporting and burning under negative pressure in a boiler, a raw coke oven gas to produce steam energy, said system comprising:

i) a battery of coke ovens;

ii) a plurality of ascension pipes connecting said coke ovens to a raw coke oven gas collector main, said ascension pipes and collector main having means for spraying flushing liquor to cool said raw coke oven gases emitted from said coke ovens and collect sprayed flushing liquor in said collector main;

iii) a transport main for transporting flushing liquor and raw coke oven gas from said collector main to a burner of a steam producing boiler, said transport main including a downcomer for separating raw coke oven gas from flushing liquor;

iv) said burner supplying air for mixing with raw coke oven gas delivered by said transport main to effect burning of raw coke oven gas in said boiler and produce a boiler exhaust;

v) a suction fan being provided at an exhaust of said boiler to draw boiler exhaust from said boiler and develop thereby a negative pressure in said coke ovens, ascension pipes, collector main, transport main, burner and boiler, said boiler having reinforced walls of substantially gas-tight construction to withstand negative pressure, raw coke oven gas in said transport main may be drawn through said burner by such negative pressure developed in said boiler by said suction fan;

vi) means for detecting a change in negative pressure in said system; and vii) a controller system for varying draw of said suction fan in response to a detected change in negative pressure in said system.

2. A system of claim 1, wherein said transport main has a partially closed back pressure control valve, said negative pressure detecting means including a first means for detecting negative pressure in said collector main, said controller system moving said control valve in response to a change in negative pressure in said collector main.

3. A system of claim 1, wherein gas mass flow rate measuring devices are provided for measuring air mass flow rate to said burner and for measuring exhaust gas mass flow rate out of said suction fan, said controller system monitoring said air and exhaust gas mass flow rate devices to provide a predetermined air to fuel ratio by adjusting air mass flow rate in response to change in coke oven gas mass flow rate which is determined by at least one of a change in back pressure control valve position, change in the difference between exhaust gas mass flow rate and air mass flow rate or change in collector main pressure.

4. A system of claim 3, wherein carbon monoxide and oxygen measuring devices are provided in an exhaust gas stream from said suction fan, said controller system monitoring carbon monoxide and oxygen concentration in exhaust and said controller system fine tuning air mass flow rate to said burner in response to a change in measured concentration of carbon monoxide and oxygen.

5. A system of claim 1, wherein said negative pressure detecting means includes a second means for detecting negative pressure in said transport main, said controller system varying draw of said suction fan in response to a detected change in negative pressure in said transport main.

6. A system of claim 1, wherein said downcomer in said transport main is adjacent said burner.

7. A system of claim 1, wherein said transport main beyond said downcomer slopes upwardly towards said burner.

8. A system of claim 7, wherein means is provided in said upwardly sloped portion of said transport main for spraying flushing liquor downwardly towards said downcomer.

9. A system of claim 1, further comprising means for adjusting coke oven gas temperature to maintain a flushing liquor inventory and minimize a surplus flushing liquor discharge.

10. A system of claim 9, wherein said means for adjusting coke oven gas temperature comprises a temperature regulated flushing liquor spray to cool said coke oven gases, said temperature regulated flushing liquor determining extent of coke oven gas cooling and thereby determining amount of moisture carried in coke oven gas through said burner.

11. A system of claim 10, further comprising means for separating solids from flushing liquor drawn from said downcomer, means for re-circulating flushing liquor to said spray means in said ascension pipes and said collector main, said re-circulating means including a flushing liquor storage tank, means for detecting level of flushing liquor in said storage tank and means for regulating temperature of the re-circulated flushing liquor, said regulating means varying extent of coke oven gas cooling by changing temperature of re-circulated flushing liquor in response to a change in flushing liquor level detected by said level detecting means.

12. A system of claim 11, wherein said solids separating means includes a tar decanter, separated flushing liquor from said tar decanter flowing to said storage tank.

13. A system of claim 1, further comprising at least one additional coke oven gas cooling system using flushing liquor spray to provide coke oven gas temperature control while maintaining a minimum temperature for flushing liquor to ensure flow of tar constituents.

14. A system of claim 13, wherein said additional coke oven gas cooling system comprises a cooling tower with downwardly directed flushing liquor spray and means for controlling flushing liquor temperature.

15. A system of claim 13, wherein said at least one additional coke oven gas cooling system comprises a flushing liquor spray in a burner main for delivery of gases from said transport main to said burner and means for controlling flushing liquor temperature.

16. A system of claim 11, wherein said flushing liquor temperature regulating means includes a liquor cooling controller, said controller moving towards closed or open position in response to detected flushing liquor level change.

17. A system of claim 11, wherein flushing liquor spray flow rate and/or temperature are increased or decreased in response to detected coke oven gas temperature where coke oven gas temperature is increased or decreased in response to detected flushing liquor level change.

* * * * *